US012023922B2

(12) United States Patent
Mou et al.

(10) Patent No.: US 12,023,922 B2
(45) Date of Patent: Jul. 2, 2024

(54) PRINTER DRIVING SYSTEM

(71) Applicant: MICROJET TECHNOLOGY CO., LTD., Hsinchu (TW)

(72) Inventors: Hao-Jan Mou, Hsinchu (TW); Ching-Sung Lin, Hsinchu (TW); Yung-Lung Han, Hsinchu (TW); Chi-Feng Huang, Hsinchu (TW); Tsung-I Lin, Hsinchu (TW); Yang Ku, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 268 days.

(21) Appl. No.: 17/568,024

(22) Filed: Jan. 4, 2022

(65) Prior Publication Data

US 2022/0219451 A1 Jul. 14, 2022

(30) Foreign Application Priority Data

Jan. 12, 2021 (TW) ................................ 110101033

(51) Int. Cl.
*B41J 2/045* (2006.01)

(52) U.S. Cl.
CPC ....... *B41J 2/04541* (2013.01); *B41J 2/04586* (2013.01)

(58) Field of Classification Search
None
See application file for complete search history.

(56) References Cited

U.S. PATENT DOCUMENTS

| | | | | |
|---|---|---|---|---|
| 6,402,299 | B1 | 6/2002 | Demeerleer et al. | |
| 2002/0036782 | A1 * | 3/2002 | Furukawa ............ | B41J 2/04548 358/1.4 |
| 2002/0058436 | A1 * | 5/2002 | Saba ....................... | F16L 25/01 439/191 |
| 2009/0195597 | A1 | 8/2009 | Silverbrook | |

FOREIGN PATENT DOCUMENTS

| | | | |
|---|---|---|---|
| CN | 101434147 | A | 5/2009 |
| CN | 102160045 | A | 8/2011 |
| CN | 102442057 | A | 5/2012 |
| CN | 104228347 | A | 12/2014 |
| CN | 204109561 | U | 1/2015 |

(Continued)

*Primary Examiner* — Erica S Lin
(74) *Attorney, Agent, or Firm* — Birch, Stewart, Kolasch & Birch, LLP

(57) ABSTRACT

A printer driving system includes a printer driving control circuit arranged on an ink cassette carrying device of a printer, an inkjet print head cassette arranged on a supporting base of the ink cassette carrying device, and a connection port. The printer driving control circuit includes a driving signal coding chip connected to a bus wire. The inkjet print head cassette includes a driving signal decoding chip and an inkjet print head chip. The driving signal decoding chip is connected to the driving signal coding chip through the bus wire. The connection port is arranged on the bus wire connected between the driving signal coding chip and the driving signal decoding chip. The inkjet print head cassette is detachably arranged on the supporting base of the ink cassette carrying device of the printer through the connection port.

4 Claims, 6 Drawing Sheets

(56) References Cited

FOREIGN PATENT DOCUMENTS

| | | | |
|---|---|---|---|
| CN | 104512105 | A | 4/2015 |
| CN | 105835531 | A | 8/2016 |
| DE | 10 2012 021 931 | A1 | 5/2014 |
| TW | 518284 | B | 1/2003 |
| TW | 553839 | B | 9/2003 |
| TW | 201213148 | A | 4/2012 |
| TW | 201627133 | A | 8/2016 |

* cited by examiner

PRINTER DRIVING SYSTEM

CROSS-REFERENCE TO RELATED APPLICATION

This non-provisional application claims priority under 35 U.S.C. § 119(a) to Patent Application No. 110101033 in Taiwan, R.O.C. on Jan. 12, 2021, the entire contents of which are hereby incorporated by reference.

BACKGROUND

Technical Field

The present disclosure relates to a driving system, in particular, to printer driving system adapted to be implemented on a printer.

Related Art

An inkjet printer is operated by moving the inkjet print head back and forth on a printing medium on a swath-by-swath basis, and ejecting the ink drop to the predetermined positions on the printing medium to form texts or patterns thereon. Therefore, the size, the shape, the material, the concentration, and the location of the ink drop generated by the inkjet print head are factors that might affect the printing quality.

A known printer ink cassette carrying device in the relevant art includes a supporting base and a circuit board. The supporting base is adapted to support an inkjet print head cassette thereon. The inkjet print head cassette has a flexible circuit board connected to the circuit board, so that electrical signals can be transmitted between the circuit board and the flexible circuit board. In order to enable the electrical connection of the inkjet print head cassette and to ensure the connection between the contact pads of the flexible circuit board on the inkjet print head cassette and the circuit board of the printer, electrical contacts are provided on the circuit board of the common printer. Therefore, the electrical signals of the circuit board can be transmitted to the flexible circuit of the inkjet print head cassette through the electrical contacts made of metal, so that the inkjet print head cassette can receive the signals and perform the inkjet printing procedures.

As shown in FIG. 1A to FIG. 1C, an ink cassette carrying device 4 of a printer is illustrated. The ink cassette carrying device 4 has a supporting base 41, a circuit board is disposed on the supporting base 41, and a plurality of electrical contacts 42 are arranged on the circuit board. The supporting base 41 is adapted to support an inkjet print head cassette 2. The inkjet print head cassette 2 includes an inkjet print head chip 22 and a flexible circuit board 23, and a plurality of electrical contacts 231 are arranged on the flexible circuit board 23. When the inkjet print head cassette 2 is installed in the supporting base 41 of the printer, an electrical connection is established between the electrical contacts 231 of the flexible circuit board 23 on the inkjet print head cassette 2 and the electrical contacts 42 of the supporting base 41 of the printer, so that the inkjet print head cassette 2 can perform the inkjet printing procedures.

The printer transmits electrical signals to the flexible circuit board 23 of the inkjet print head cassette 2 through these electrical contacts 42, so that the inkjet print head chip 22 of the inkjet print head cassette 2 can receive the electrical signals and be driven by the printer to perform the inkjet printing procedures. However, the inkjet print head cassette 2 should be fixed on the supporting base 41, so as to allow the inkjet printing procedure to perform at the right position. Moreover, as the inkjet print head cassette 2 has to be replaced frequently, the electrical contacts 231 has to be precisely in contact with the electrical contacts 42 during assembling the inkjet print head cassette 2 to the supporting base 41, so as to allow the printing procedure to be performed correctly. As a result, when the electrical contacts 231 and the electrical contacts 42 are not in contact with each other precisely, the printer would be fail to drive the inkjet print head cassette 2 and perform the inkjet printing procedure.

In view of the issue of electrical connection occurred upon assembling the inkjet print head cassette to the supporting base of the ink cassette carrying device 4, in accordance with one or some embodiments of the present disclosure, a printer driving system is provided, and the issue of electrical connection mentioned above can be solved by providing a busbar connector (which may be a USB), so as to allow the inkjet print head cassette to be positioned with the printer and assembled or disassembled with the supporting base 41 quickly and conveniently without affecting the signal connection of the inkjet print head cassette.

SUMMARY

One object of the present disclosure is to provide a printer driving system, more specifically, in one embodiment, to a busbar connector (such as a USB) providing between the supporting base of a printer and the inkjet print head cassette. Through the quick positioning and connection of the busbar connector (such as a USB), the inkjet print head cassette can be quickly positioned with the supporting base of the printer and assembled or disassembled from the supporting base of the printer conveniently without affecting the signal connection of the inkjet print head cassette.

To achieve the object mentioned above, in one embodiment of the present disclosure, a printer driving system is provided to be implemented on a printer. The system includes a printer driving control circuit, an inkjet print head cassette, and a connection port. The printer driving control circuit is arranged on the printer and includes a driving signal coding chip. The driving signal coding chip is connected to a bus wire to output a driving signal. The inkjet print head cassette is arranged on a supporting base of the printer and includes a driving signal decoding chip and an inkjet print head chip. The driving signal decoding chip is connected to the driving signal coding chip of the printer driving control circuit through the bus wire, the driving signal coding chip provides the driving signal for the driving signal decoding chip to obtain a decoding signal, and the decoding signal is then outputted and received by the inkjet print head chip to perform an inkjet printing procedure. The connection port is arranged on the bus wire connected between the driving signal coding chip and the driving signal decoding chip. The inkjet print head cassette is detachably arranged on the supporting base of the printer through the connection port.

BRIEF DESCRIPTION OF THE DRAWINGS

The disclosure will become more fully understood from the detailed description given herein below, for illustration only and thus not limitative of the disclosure, wherein.

DETAILED DESCRIPTION

The present disclosure will now be described more specifically with reference to the following embodiments. It is to be noted that the following descriptions of different embodiments of this disclosure are presented herein for purpose of illustration and description only, and it is not intended to limit the scope of the present disclosure.

Figure 1A:
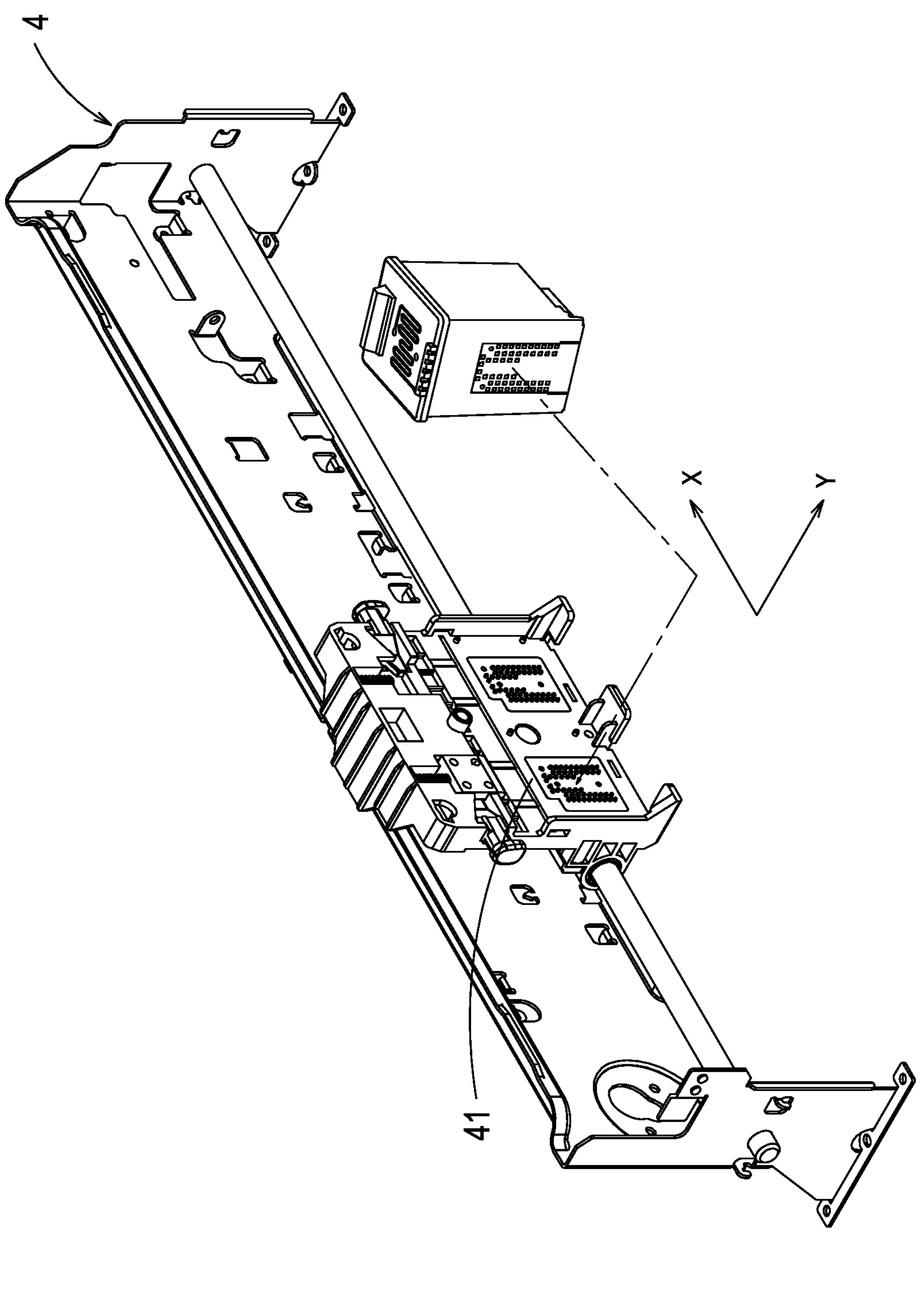
FIG. 1A (PRIOR ART)
FIG. 1A illustrates a schematic view of the separated ink cassette carrying device from the ink cassette of a printer known in the relevant art.
Figure 1B:
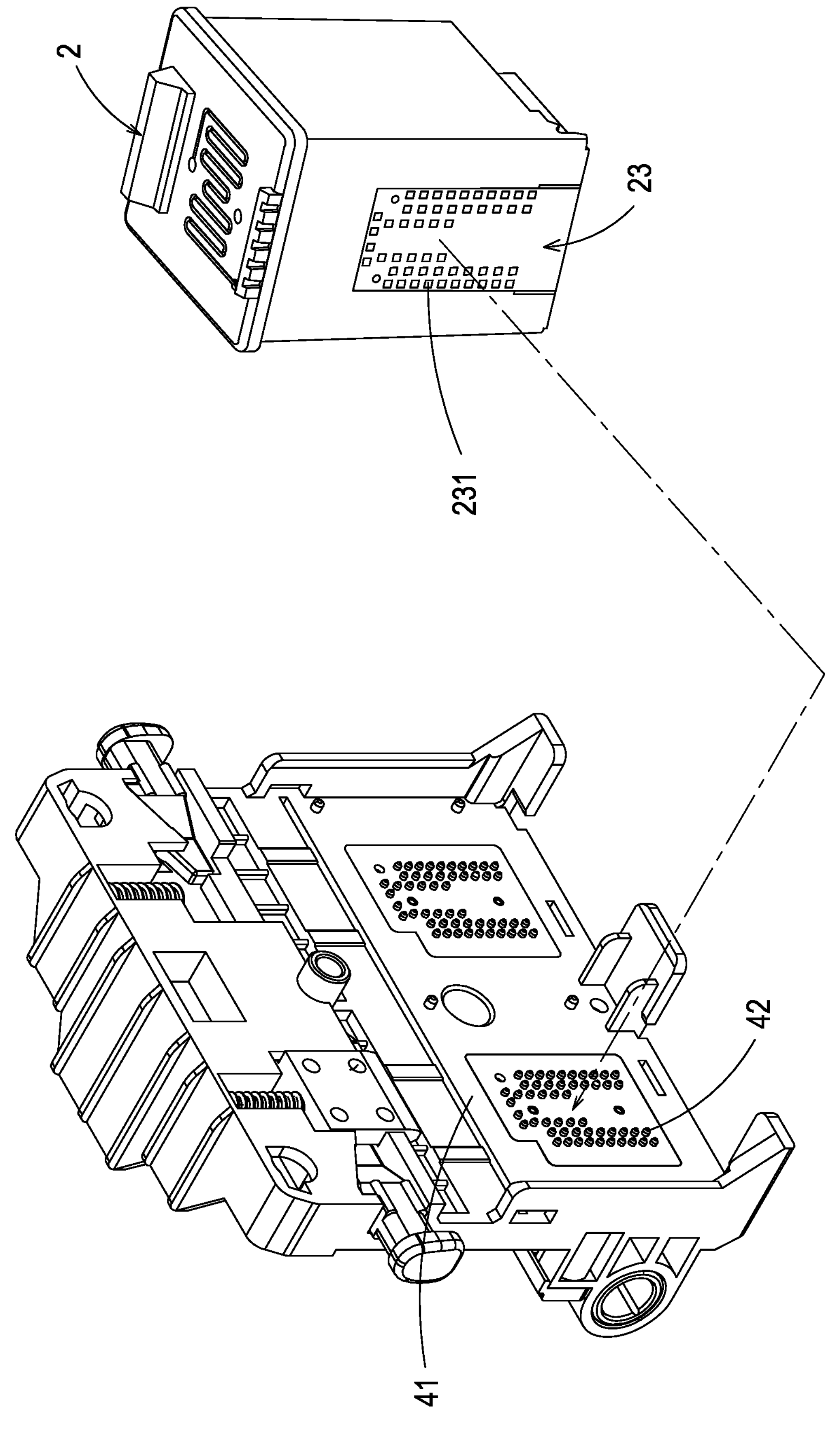
FIG. 1B (PRIOR ART)
FIG. 1B illustrates a schematic view of the separated supporting base from the ink cassette of the printer known in the relevant art.
Figure 1C:
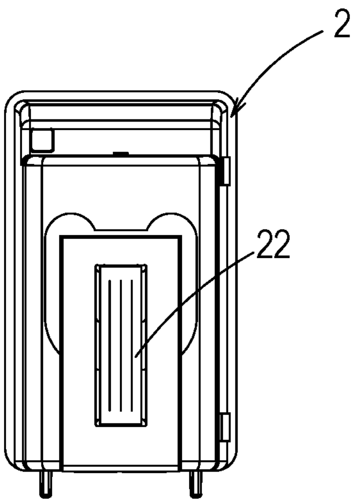
FIG. 1C (PRIOR ART)
FIG. 1C illustrates a schematic view of the ink cassette known in the relevant art from another perspective.
Figure 2:
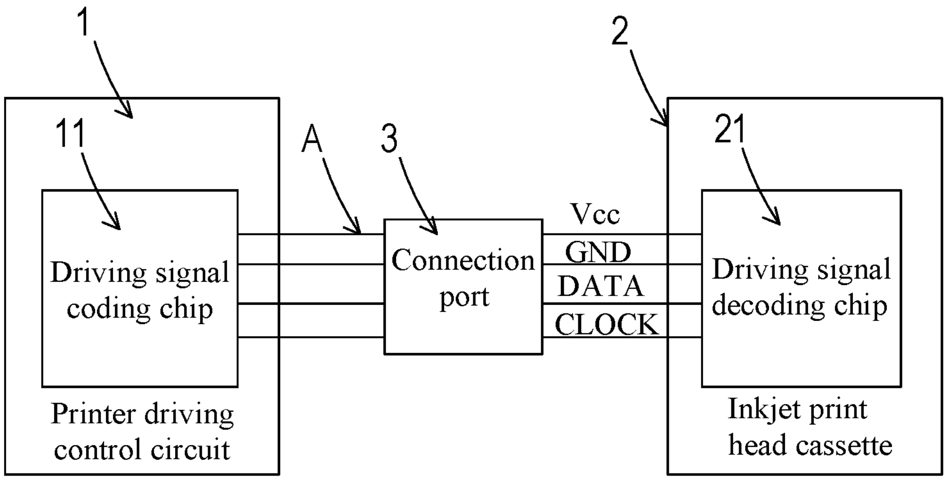
FIG. 2 illustrates a circuit block diagram of a printer driving system according to an exemplary embodiment of the present disclosure.
Figure 3A:
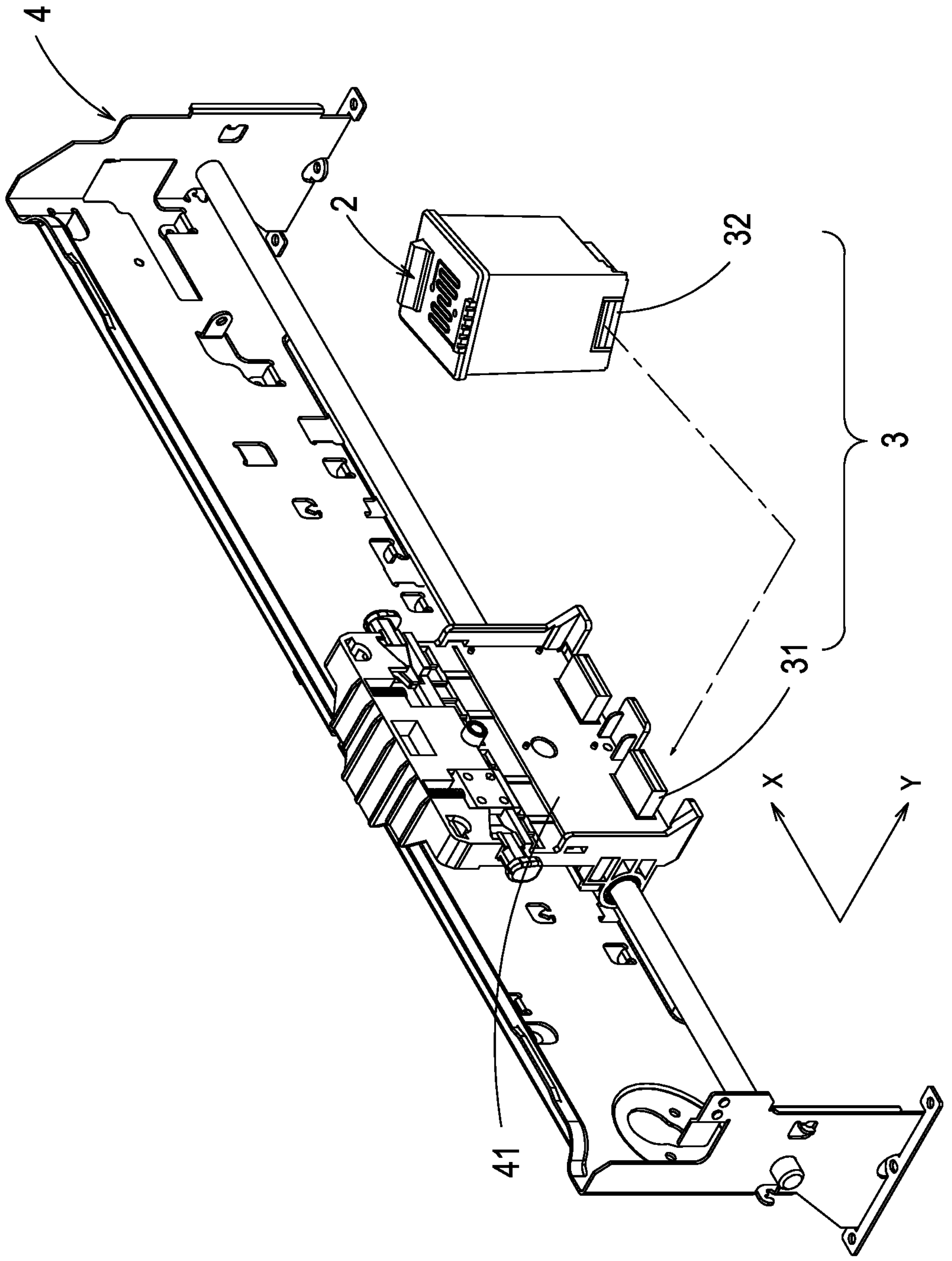
FIG. 3A illustrates a schematic view of a separated ink cassette carrying device from an inkjet print head cassette of a printer of the exemplary embodiment of the present disclosure.
Figure 3B:
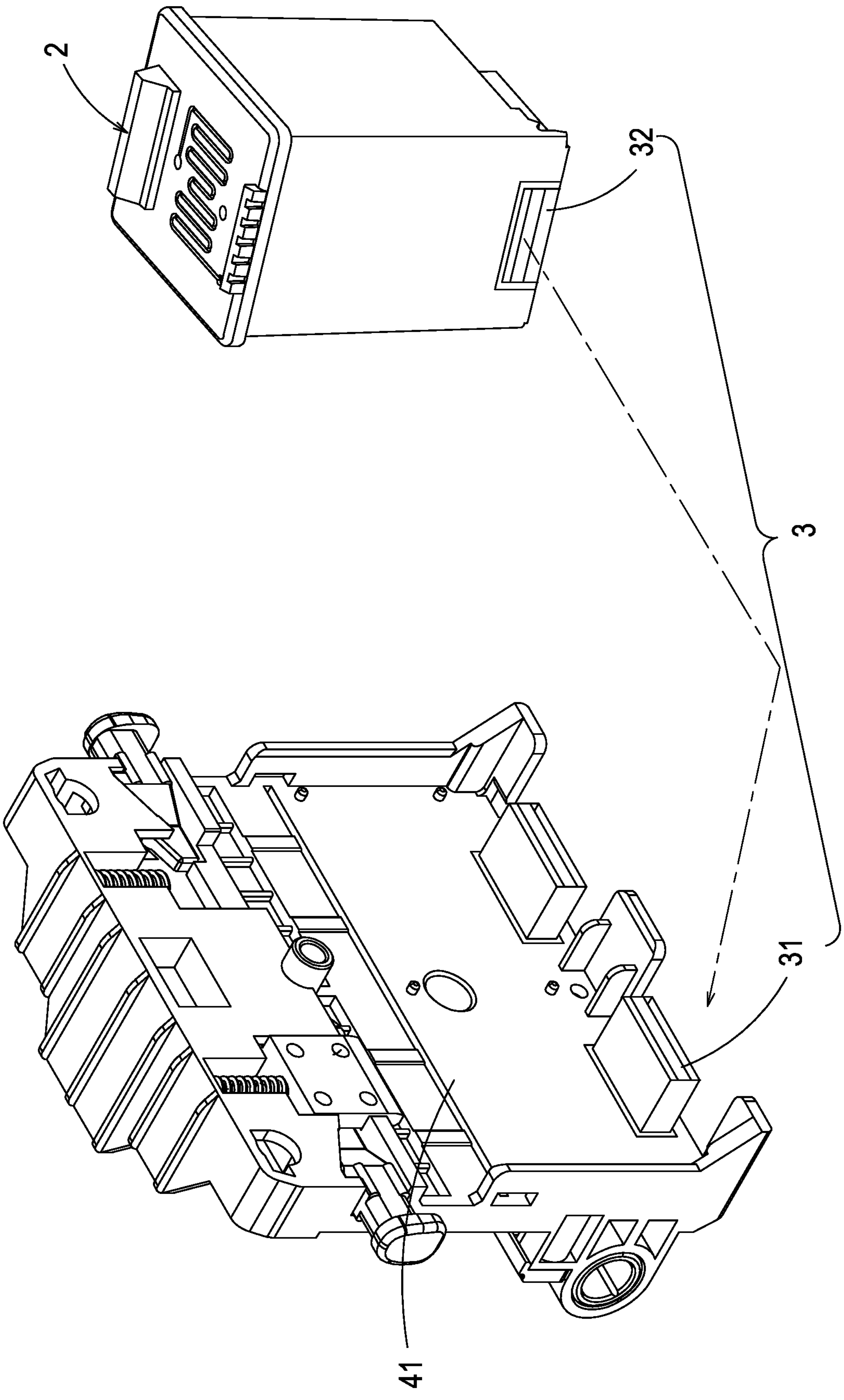
FIG. 3B illustrates a schematic view of the separated supporting base from the inkjet print head cassette of the printer of the exemplary embodiment of the present disclosure.

Please refer to FIG. 2, FIG. 3A, and FIG. 3B. A printer driving system adapted to be implemented on a printer having an ink cassette carrying device 4 is provided. The printer driving system includes a printer driving control circuit 1, an inkjet print head cassette 2, and a connection port 3. The ink cassette carrying device 4 of the printer has a supporting base 41. The printer driving control circuit 1 is arranged on the printer (not shown) and includes a driving signal coding chip 11, and the driving signal coding chip 11 is connected to a bus wire A and adapted to output a driving signal. The inkjet print head cassette 2 is arranged on the supporting base 41 of the ink cassette carrying device 4 of the printer and includes a driving signal decoding chip 21 and an inkjet print head chip 22. The driving signal decoding chip 21 is electrically connected to the driving signal coding chip 11 of the printer driving control circuit 1 through the bus wire A, and the driving signal decoding chip 21 receives the driving signal transmitted by the driving signal coding chip 11. The driving signal may be a driving signal pulse (Clock), a driving signal data (Data), a power ground signal (Gnd), or a power signal (Vcc).

The connection port 3 is arranged on the bus wire A to which the driving signal coding chip 11 and the driving signal decoding chip 21 are connected. In this embodiment, the connection port 3 is a busbar connector (for example, a USB connector) and includes a first connection terminal 31 and a second connection terminal 32. The first connection terminal 31 is connected to the bus wire A to which the driving signal coding chip 11 is connected. As shown in FIG. 3B, the first connection terminal 31 may be arranged on the supporting base 41 of the ink cassette carrying device 4 of the printer, and the rear portion of the first connection terminal 31 is connected to the bus wire A to which the driving signal coding chip 11 is connected (not shown). The second connection terminal 32 is connected to the bus wire A to which the driving signal decoding chip 21 is connected. As shown in FIG. 3B, the second connection terminal 32 may be arranged on the inkjet print head cassette 2, and the rear portion of the second connection terminal 32 is connected to the bus wire A to which the driving signal decoding chip 21 is connected (not shown). Hence, as the first connection terminal 31 and the second connection terminal 32 are connected with each other, the driving signal of the driving signal coding chip 11 can be transmitted to the driving signal decoding chip 21 through the bus wire A. In this embodiment, the first connection terminal 31 is a male terminal (as shown in FIG. 3B), and the second connection terminal 32 is a female terminal (as shown in FIG. 3B). Therefore, the first connection terminal 31 and the second connection terminal 32 can be connected with each other, and the driving signal of the driving signal coding chip 11 can be transmitted to the driving signal decoding chip 21 through the bus wire A. Alternatively, in another embodiment, the first connection terminal 31 is a female terminal (not shown), and the second connection terminal 32 is a male terminal (not shown). Therefore, the first connection terminal 31 and the second connection terminal 32 can be connected with each other, and the driving signal of the driving signal coding chip 11 can be transmitted to the driving signal decoding chip 21 through the bus wire A.

In this embodiment, the inkjet print head cassette 2 is arranged on a supporting base 41 of the ink cassette carrying device 4 of the printer. The driving signal decoding chip 21 is electrically connected to the driving signal coding chip 11 of the printer driving control circuit 1 through the bus wire A and the connection port 3, and the driving signal of the driving signal coding chip 11 is provided to the driving signal decoding chip 21 to obtain a decoding signal, and the decoding signal is then outputted and received by the inkjet print head chip 22 to perform an inkjet printing procedure. Therefore, according to one or some embodiment of the present disclosure, the inkjet print head cassette 2 is arranged on the supporting base 41 of the ink cassette carrying device 4 of the printer through the connection port 3, so that the inkjet print head cassette 2 can be assembled on or disassembled from the supporting base 41 of the ink cassette carrying device 4 of the printer conveniently.

Based on above content, according to one or some embodiments of the present disclosure, a printer driving system is provided. The inkjet print head cassette 2 is arranged on and electrically connected to the supporting base 41 of the ink cassette carrying device 4 of the printer through the electrical connection of the bus wire A and the connection port 3. The driving signal coding chip 11 is arranged on the printer driving control circuit 1, and the driving signal decoding chip 21 is arranged on the inkjet print head cassette 2, so that the driving signal of the driving signal coding chip 11 can be provided to the driving signal decoding chip 21 through the electrical connection of the bus wire A and the connection port 3 to obtain a decoding signal. The decoding signal is outputted and received by the inkjet print head chip 22 to perform the inkjet printing procedure. Consequently, the issue of precisely positioning between the electrical contacts 231 of the inkjet print head cassette 2 and the electrical contacts 42 of the supporting base 41 required upon assembling the inkjet print head cassette 2 to the ink cassette carrying device 4 can be properly fulfilled. Moreover, in one or some embodiments of the present disclosure, the inkjet print head cassette 2 is arranged on the supporting base 41 of the ink cassette carrying device 4 through the connection port 3, so as to allow the inkjet print head cassette 2 to be assembled on or disassembled from the ink cassette carrying device 4 conveniently and quickly.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A printer driving system, adapted to be implemented on a printer, wherein the system comprises:

a printer driving control circuit arranged on an ink cassette carrying device of the printer and comprising a driving signal coding chip, wherein the driving signal coding chip is connected to a bus wire to output a driving signal;

an inkjet print head cassette arranged on a supporting base of the printer and comprises a driving signal decoding chip and an inkjet print head chip, wherein the driving signal decoding chip is connected to the driving signal coding chip of the printer driving control circuit through the bus wire, the driving signal coding chip provides the driving signal to the driving signal decoding chip to obtain a decoding signal, and the decoding signal is then outputted and received by the inkjet print head chip to perform an inkjet printing procedure;

a connection port arranged on the bus wire connected between the driving signal coding chip and the driving signal decoding chip;

wherein the inkjet print head cassette is detachably arranged on the supporting base of the printer through the connection port;

wherein the connection port is a busbar connector comprising a first connection terminal and a second connection terminal; the first connection terminal is connected to the bus wire to which the driving signal coding chip is connected, and the second connection terminal is connected to the bus wire to which the driving signal decoding chip is connected; the first connection terminal and the second connection terminal are connected with each other; and wherein the first connection terminal or the second terminal is a male terminal, and the male terminal is extended parallel to a horizontal plane.

2. The printer driving system according to claim 1, wherein the driving signal is a driving signal pulse, a driving signal data, a power ground signal, or a power signal.

3. The printer driving system according to claim 1, wherein the first connection terminal is a male terminal, and the second connection terminal is a female terminal.

4. The printer driving system according to claim 1, wherein the first connection terminal is a female terminal, and the second connection terminal is a male terminal.

* * * * *